(12) United States Patent
Scholzen et al.

(10) Patent No.: US 8,079,253 B2
(45) Date of Patent: Dec. 20, 2011

(54) COMBUSTION CHAMBER PRESSURE SENSOR

(75) Inventors: Holger Scholzen, Stuttgart (DE); Markus Ledermann, Salach (DE)

(73) Assignee: Robert Bosch GmbH, Stuttgart (DE)

( * ) Notice: Subject to any disclaimer, the term of this patent is extended or adjusted under 35 U.S.C. 154(b) by 149 days.

(21) Appl. No.: 12/573,515

(22) Filed: Oct. 5, 2009

(65) Prior Publication Data
US 2010/0083741 A1    Apr. 8, 2010

(30) Foreign Application Priority Data
Oct. 7, 2008 (DE) .......................... 10 2008 042 645

(51) Int. Cl.
*G01M 15/08* (2006.01)
(52) U.S. Cl. .................................................. 73/114.18
(58) Field of Classification Search ............. 73/35.12, 73/114.16, 114.18, 114.19
See application file for complete search history.

(56) References Cited

U.S. PATENT DOCUMENTS

| | | | |
|---|---|---|---|
| 5,726,351 A * | 3/1998 | Glaser | 73/114.19 |
| 7,337,657 B2 * | 3/2008 | Haussner et al. | 73/114.18 |
| 7,555,932 B2 * | 7/2009 | Hirose et al. | 73/35.12 |
| 7,581,520 B2 * | 9/2009 | Kern et al. | 123/145 A |
| 7,624,620 B2 * | 12/2009 | Hirose et al. | 73/35.12 |
| 2005/0061063 A1 * | 3/2005 | Haussner et al. | 73/116 |
| 2007/0209624 A1 * | 9/2007 | Ludwig et al. | 123/145 A |
| 2007/0289370 A1 * | 12/2007 | Hirose et al. | 73/116 |
| 2008/0229815 A1 * | 9/2008 | Bekker et al. | 73/114.19 |
| 2008/0302323 A1 * | 12/2008 | Kern et al. | 123/145 A |

FOREIGN PATENT DOCUMENTS
DE    103 12 174    7/2004
DE    10 2005 025 062    7/2006
* cited by examiner

*Primary Examiner* — Freddie Kirkland, III
(74) *Attorney, Agent, or Firm* — Kenyon & Kenyon LLP

(57) ABSTRACT

A combustion chamber pressure sensor for an internal combustion engine, having a sensor body able to be inserted into a receiving bore of the internal combustion engine, which sensor body has on the side of the combustion chamber a sealing device for sealing the sensor body in the receiving bore, and which sensor body is provided with affixation means for fixing the combustion chamber pressure sensor in place inside the receiving bore. The sealing device includes at least one separately produced heat-resistant elastic sealing element, which is disposed around an outer jacket of the sensor body.

9 Claims, 2 Drawing Sheets

COMBUSTION CHAMBER PRESSURE SENSOR

BACKGROUND INFORMATION

The use of combustion chamber pressure sensors for detecting the pressure prevailing in the combustion chamber of an internal combustion engine is already known. Known combustion chamber pressure sensors usually have a longitudinal sensor body, which can be placed into a receiving opening on the cylinder head of the internal combustion engine. Such a combustion chamber pressure sensor is described in German Patent No. DE 103 12 174, for instance, which describes a combustion chamber pressure sensor whose housing forms a bore hole into which a transmission plunger made of ceramic material is inserted, whose one end is sitting on a measuring element and acting on it such that a measuring signal is generated which is proportional to the pressure to be detected, and whose other end is resting on a diaphragm sealing the bore.

German Patent No. DE 10 2005 025 062 describes a combustion chamber pressure sensor, in which the sensor element detecting the combustion chamber pressure is integrated into the housing of a sheathed-element glow plug.

The known combustion chamber pressure sensors use a conical sealing seat as a sealing device to seal the sensor body in the receiving bore on the cylinder head of the internal combustion engine. To this end, the steel jacket of the sensor body is provided with a conical sealing surface at its end on the side of the combustion chamber. Furthermore, the outer jacket has a screw thread with whose aid the sensor body is able to be screwed into the receiving bore, thereby pressing the conical sealing seat of the sensor body against a correspondingly shaped counter surface on the cylinder head, so that sealing is achieved. In order to obtain sufficient heat dissipation and vibration resistance, the conical sealing surface is placed as far forward as possible on the sensor body on the combustion chamber side, while the screw thread, due to the installation situation at the internal combustion engine, should be placed as far away as possible from the end of the sensor body on the combustion chamber side. As a consequence, the sensor body must absorb the torque applied during the screw-fitting and the resulting axial forces acting in the direction of the longitudinal extension virtually across its entire longitudinal extension.

Moreover, the sensor body of the known combustion chamber pressure sensors is virtually clamped between the conical sealing seat and the screw thread section, which is why deformations of the cylinder head caused by the combustion chamber pressure and also thermal expansions caused by the combustion process in the combustion chamber are transmitted to the steel jacket of the combustion chamber pressure sensor in their entirety. If the measuring element is not sufficiently decoupled from the sensor body, these deformations and thermal expansions are transmitted to the measuring element and may cause measuring errors in the measuring element. Some approaches therefore use a complicated construction in the interior of the sensor body in order to decouple the measuring element from the disadvantageous effects.

SUMMARY OF THE INVENTION

The combustion chamber pressure sensor according to the present invention makes it possible to retain the advantages obtained by placing the sealing means very much forward on the side of the sensor body facing the combustion chamber pressure, and an excellent thermal coupling of the sensor body to the cylinder head of the internal combustion engine surrounding the receiving bore is obtained at the same time. In comparison with the approaches known from the related art, however, the sensor body is not clamped between the sealing device and the affixation means in the axial direction, so that no axial twisting advantageously occurs between these sections of the sensor body, and neither the torque applied during the screw-fitting nor an axial force resulting therefrom are transmitted to the measuring element. Moreover, it is achieved that forces and deformations that arise in the cylinder head during the combustion process do not lead to measuring errors in the measuring element. A complicated mechanical decoupling of measuring element and sensor body in the interior of the combustion chamber pressure sensor is therefore not necessary.

The sealing element is advantageously made from a heat-resistant elastic material, so that, for one, the sealing force required for sealing is able to be generated from radial bracing of the sealing element in the cylinder head and, for another, the sealing element easily withstands the temperatures inside the combustion chamber.

Deposits within the receiving bore of combustion residue on the surface of the sealing element facing the combustion chamber advantageously increase the sealing effect and the thermal coupling of the sensor body to the cylinder head.

In one advantageous exemplary embodiment, the sealing element takes the shape of a ring and may simply be slipped onto the sensor body, for example.

By giving the outer diameter of the sealing element a larger diameter than the inner diameter of the receiving bore on the cylinder head, the sealing element is advantageously prestressed against the inner wall of the receiving bore when the sensor body is inserted into the receiving bore, thereby achieving effective sealing.

In an advantageous manner, the sealing element has high thermal conductivity, so that the combustion chamber pressure sensor is thermally coupled to the cylinder head in a very satisfactory manner, and effective cooling of the combustion chamber pressure sensor with the aid of the cooling means provided on the cylinder of the internal combustion chamber is able to take place. It is especially advantageous to form the sealing element from graphite or Teflon, because these materials have the required elasticity and provide high thermal conductivity at the same time.

It is especially easy to mount the sealing element on the outer jacket of the sensor body. The sensor element may be designed in the shape of a bushing, for example, and fixed in place in an annular groove on the outer jacket of the sensor body.

DETAILED DESCRIPTION

Figure 1:
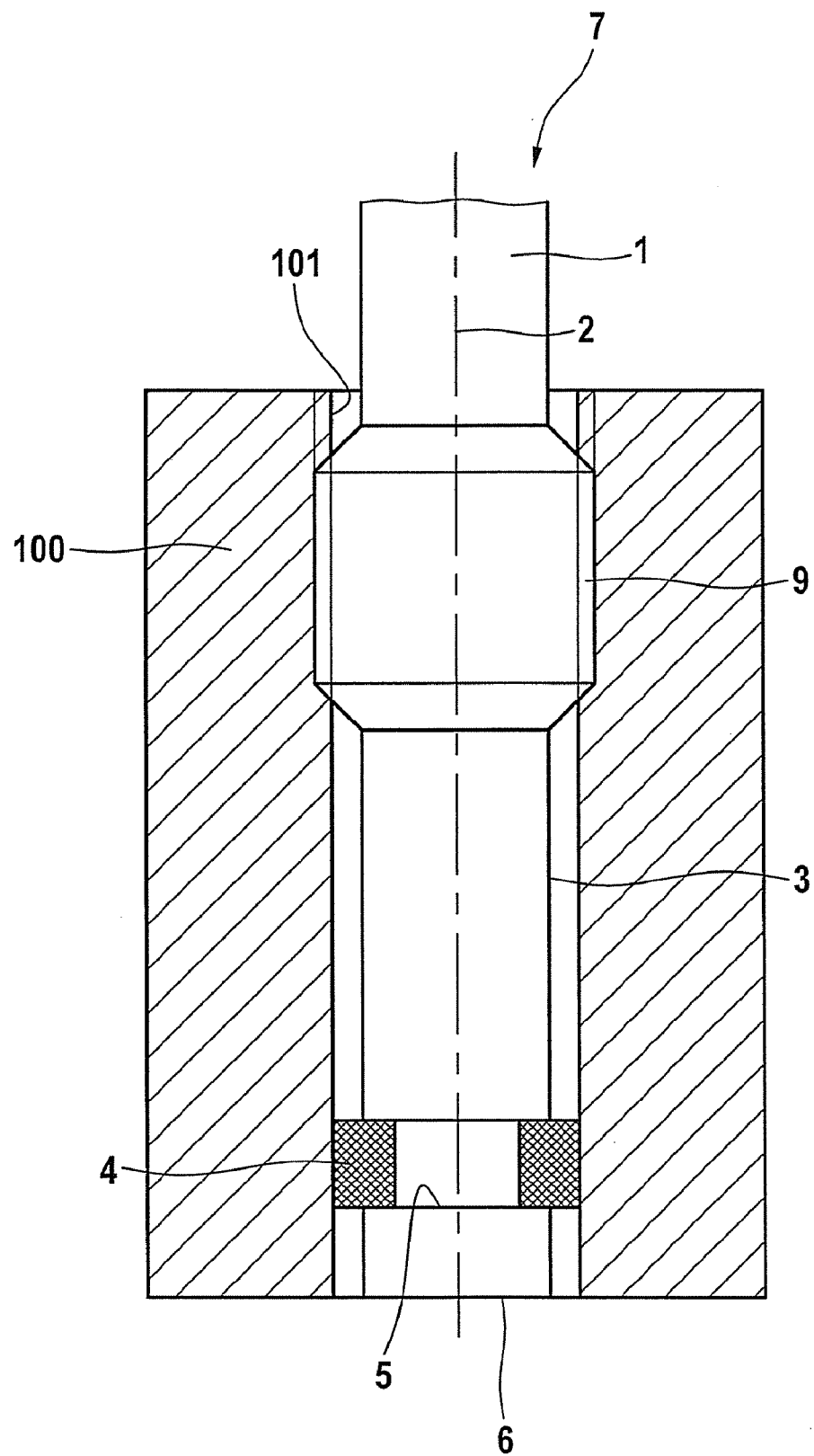
FIG. 1 shows a schematic cross section through the combustion chamber pressure sensor according to the present invention, in its installation position in the receiving bore of an internal combustion engine according to a first exemplary embodiment of the present invention.

FIG. 1 shows a first exemplary embodiment of a combustion chamber pressure sensor according to the present invention in a heavily simplified development. The combustion chamber pressure sensor includes an essentially cylindrical sensor body 1, which extends along a longitudinal axis 2 and simultaneously forms the sensor housing of the combustion chamber pressure sensor. The internal structure of the combustion chamber pressure sensor is not shown in FIG. 1 and also not relevant for understanding the present invention. For instance, the combustion chamber pressure sensor may have the internal structure shown in German Patent No. DE 103 12 174, including a transmission plunger and a diaphragm on the side facing the combustion chamber pressure. However, any other types of sensors are possible as well. In addition to the known semiconductor pressure sensor elements, piezoelectric sensor elements, metal diaphragm sensors, optoelectronic sensor elements and others may also be used. The combustion chamber pressure sensor shown in FIG. 1 absorbs the combustion chamber pressure at its end face 6 facing the combustion chamber. To this end, a diaphragm, a pressure transmission pin or some other suitable element may be disposed there, whose deformation or displacement under the action of the pressure prevailing in the combustion chamber is transmitted to a sensor element situated in the interior of sensor body 1. At end 7 of sensor body 1 facing away from the combustion chamber, the combustion chamber pressure sensor is preferably provided with electric connection elements (not shown) for contacting the sensor element in the interior of sensor body 1.

Sensor body 1 has an outer jacket 3 whose diameter is smaller than the inner diameter of a receiving bore 101 on a cylinder head of an internal combustion engine 100, so that the sensor body is able to be inserted into receiving bore 101 via its end face 6. On the end of sensor body 1 facing away from the combustion chamber, it is screwed into a correspondingly shaped mating thread on the inner wall of receiving bore 101 via a thread section 9. Screw thread section 9 is provided as far away as possible from end face 6 on the combustion chamber side, but still within the longitudinal extension of receiving bore 101 on sensor body 1. Viewed in the direction of longitudinal axis 2, outer jacket 3 of sensor body 1 is provided with an annular groove 5 just in front of end face 6, into which a heat-resistant elastic sealing element 4 is inserted. Sealing element 4 surrounds sensor body 1 in the form of a ring and has a bushing-shaped cylindrical form having an inner recess through which the sensor body projects. The outer diameter of sealing element 4 is greater than the inner diameter of receiving bore 101, so that elastic sealing element 4 is pressed together in the radial direction when sensor body 1 is inserted into receiving bore 101 and thereby applies a radial clamping force required to seal the combustion chamber, which force is supported on the inner sheath of receiving bore 101. In contrast to the exemplary embodiment shown in FIG. 1, the sealing element need not have the shape of a bushing. Furthermore, it is also possible to dispense with annular groove 5 and to fix sealing element 4 in place on sensor body 1 in some other manner, or to mount the sealing element in receiving bore 101 and then to slip sensor body 1 through the sealing element fixed in place inside receiving bore 101.

Important is that sealing element 4 is made from a heat-resistant elastic material. In this context heat-resistance denotes the resistance of the material at increased temperatures. Especially suitable materials for this purpose are graphite or Teflon, for example.

Figure 2:
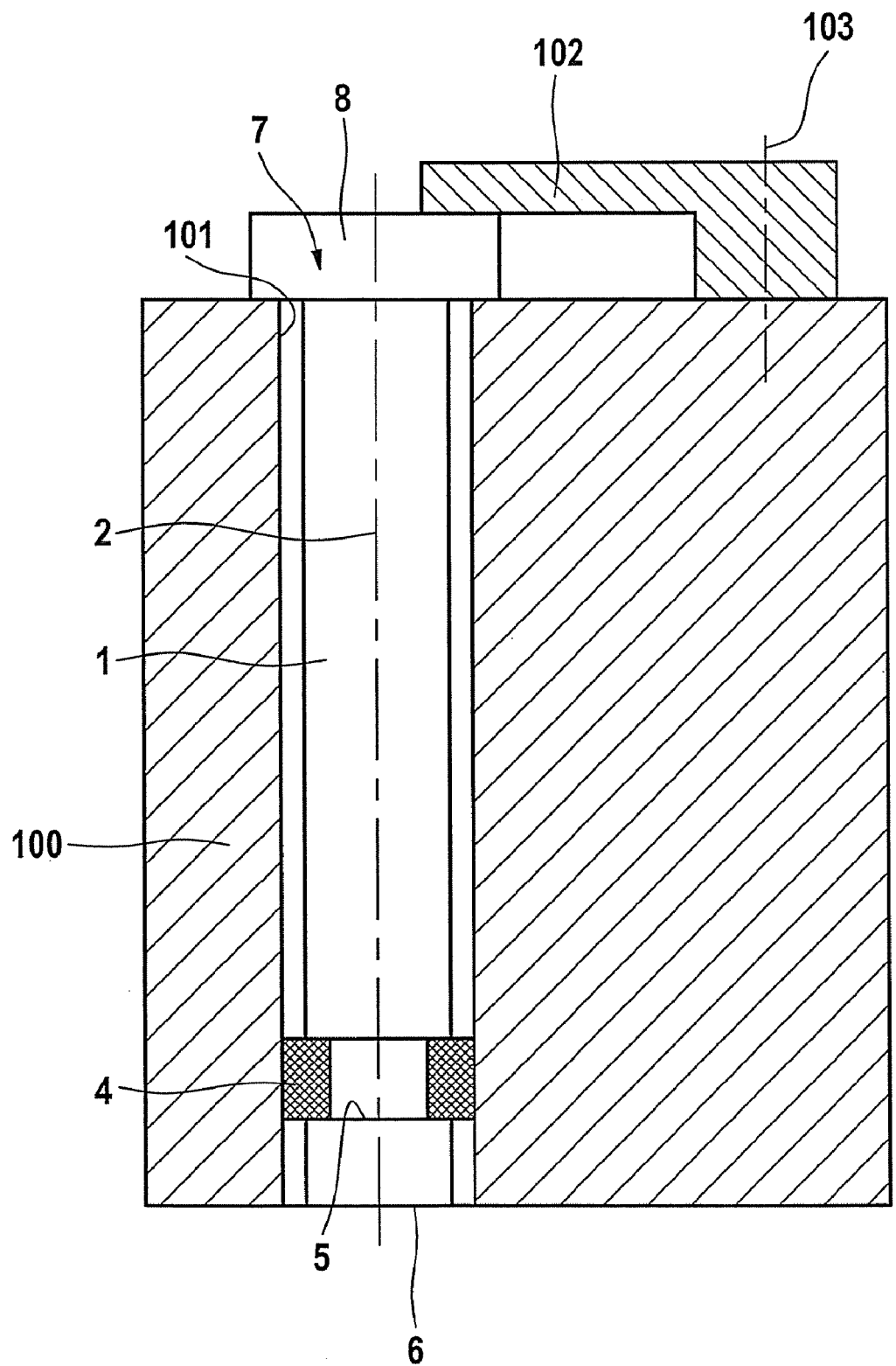
FIG. 2 shows a schematic cross section through the combustion chamber pressure sensor according to the present invention, in its installation position in the receiving bore of an internal combustion engine according to a second exemplary embodiment of the present invention.

FIG. 2 shows a second exemplary embodiment of the combustion chamber pressure sensor according to the present invention. In this exemplary embodiment, sensor body 1 is formed as a cylindrical base element, whose length corresponds to the length of receiving bore 101. End 7 of sensor body 1 facing away from end face 6 on the combustion chamber side is provided with a headpiece 8, which overlaps receiving bore 101, so that headpiece 8 makes contact on the side of internal combustion engine 100 facing away from the combustion chamber once sensor body 1 has been inserted. In this exemplary embodiment, headpiece 8 is pressed against the cylinder head of internal combustion engine 100 with the aid of a clamping shoe 102. For this purpose clamping shoe 102 overlaps headpiece 8 and is fixed in place on the internal combustion engine with the aid of threaded affixation means 102, for example.

In gasoline engines or diesel engines, the combustion chamber pressure sensor according to the present invention may provide signals that represent the combustion chamber pressure for the control of the internal combustion engine, or it may be used to adapt an engine to different fuel qualities having different combustion behaviors.

What is claimed is:

1. A combustion chamber pressure sensor for an internal combustion engine comprising:
a sensor body able to be inserted into a receiving bore formed in a cylinder head of the internal combustion engine, the sensor body having on a combustion-chamber side a sealing device for sealing the sensor body in the receiving bore, and having affixation means for fixing the combustion chamber pressure sensor in place inside the receiving bore, the sealing device including at least one separately-produced heat-resistant elastic sealing element situated around an outer jacket of the sensor body and configured to directly contact the receiving bore formed in the cylinder head to form a seal between the outer jacket of the sensor body and the cylinder head and to thermally couple the sensor body to the cylinder head.

2. The combustion chamber pressure sensor according to claim 1, wherein the sealing element is in the shape of a ring.

3. The combustion chamber pressure sensor according to claim 1, wherein the sealing element is in the shape of a bushing.

4. The combustion chamber pressure sensor according to claim 1, wherein the sealing element has high thermal conductivity.

5. The combustion chamber pressure sensor according to claim 1, wherein the sealing element is mounted on the outer jacket of the sensor body.

6. The combustion chamber pressure sensor according to claim 5, wherein the sealing element is fixed in place in an annular groove on the outer jacket of the sensor body.

7. The combustion chamber pressure sensor according to claim 1, wherein the sealing element is prestressed against an inner wall of the receiving bore when the sensor body is inserted.

8. The combustion chamber pressure sensor according to claim 1, wherein the sealing element is made from graphite.

9. The combustion chamber pressure sensor according to claim 1, wherein the sealing element is made from polytetrafluoroethylene.

* * * * *